(12) United States Patent
Thomas et al.

(10) Patent No.: US 7,471,734 B2
(45) Date of Patent: Dec. 30, 2008

(54) SPACE-TIME TRANSMIT DIVERSITY SCHEME FOR TIME-DISPERSIVE PROPAGATION MEDIA

(75) Inventors: Joseph Thomas, Columbia, MD (US); Steven C. Jasper, Hoffman Estates, IL (US); James P. Michels, Elk Grove Village, IL (US)

(73) Assignee: Motorola, Inc., Schaumburg, IL (US)

( * ) Notice: Subject to any disclaimer, the term of this patent is extended or adjusted under 35 U.S.C. 154(b) by 807 days.

(21) Appl. No.: 10/131,429

(22) Filed: Apr. 24, 2002

(65) Prior Publication Data

US 2002/0181430 A1 Dec. 5, 2002

Related U.S. Application Data

(60) Provisional application No. 60/286,774, filed on Apr. 26, 2001.

(51) Int. Cl.
*H04L 27/00* (2006.01)
(52) U.S. Cl. .................. 375/295; 375/296; 375/316
(58) Field of Classification Search ................ 375/295, 375/299, 316, 346, 347, 348, 296
See application file for complete search history.

(56) References Cited

U.S. PATENT DOCUMENTS

| | | | | |
|---|---|---|---|---|
| 6,661,856 B1 * | 12/2003 | Calderbank et al. | .......... | 375/347 |
| 6,775,329 B2 * | 8/2004 | Alamouti et al. | ............ | 375/267 |
| 6,788,661 B1 * | 9/2004 | Ylitalo et al. | ............... | 370/334 |
| 6,804,307 B1 * | 10/2004 | Popovic | ...................... | 375/299 |
| 6,834,043 B1 * | 12/2004 | Vook et al. | ................... | 370/310 |
| 6,842,494 B2 * | 1/2005 | Ionescu | ...................... | 375/295 |
| 6,891,903 B2 * | 5/2005 | Jafarkhani et al. | .......... | 375/299 |
| 6,959,047 B1 * | 10/2005 | Al-Dhahir et al. | ........... | 375/267 |
| 7,139,324 B1 * | 11/2006 | Ylitalo et al. | ............... | 375/267 |
| 7,154,958 B2 * | 12/2006 | Dabak et al. | ................ | 375/267 |
| 7,190,734 B2 * | 3/2007 | Giannakis et al. | ........... | 375/267 |
| 7,206,606 B2 * | 4/2007 | Kobayashi et al. | ........ | 455/562.1 |
| 7,227,905 B2 * | 6/2007 | Viswanathan | ............... | 375/267 |
| 2001/0017903 A1 * | 8/2001 | Naguib et al. | ............... | 375/347 |
| 2002/0080894 A1 * | 6/2002 | Dabak et al. | ................ | 375/316 |
| 2002/0193146 A1 * | 12/2002 | Wallace et al. | .............. | 455/562 |

OTHER PUBLICATIONS

Thomas, J. "On the Capacity Achieved by Space-Time Block Codes." Institute for Systems Research, College Park, MD. May 2, 1999.
Steiner, B. et al. "Optimum and Suboptimum Channel Estimation for the Uplink of CDMA Mobile Radio Systems with Joint Detection." *European Transactions on Telecommunications and Related Technologies*, vol. 5, No. 1, Jan.-Feb. 1994, pp. 39-50.

(Continued)

*Primary Examiner*—Chieh M. Fan
*Assistant Examiner*—Jason M. Perilla

(57) ABSTRACT

This invention extends Alamouti's scheme for wideband TDMA systems; it then works in conjunction with time-domain equalization. In fact, the present invention envisages time-domain DFE or MLSE equalization (which is more robust than linear frequency-domain equalization) via the use of a training mid-amble to separate adjacent sub-blocks; this mid-amble is used in equalizer training and its direct and inter-symbol interference contributions to the received signal, are subtractively eliminated to facilitate the detection process itself. This approach may be applied to all systems in time-dispersive propagation media, where the burst or slot length is short enough that the fading can be considered time-invariant over its duration.

7 Claims, 2 Drawing Sheets

OTHER PUBLICATIONS

"A Transmit Diversity Scheme for Channels with Intersymbol Interference," by A. Lindskog and A. Paulraj. Proceeding of the International Conference on Communications, 2000, pp. 307-311.

Siavash Alamouti, "A simple transmit diversity technique for wireless communications," IEEE Journal on Selected Areas in Communications, Oct. 1998.

* cited by examiner

SPACE-TIME TRANSMIT DIVERSITY SCHEME FOR TIME-DISPERSIVE PROPAGATION MEDIA

REFERENCE(S) TO RELATED APPLICATION(S)

The present application claims priority from provisional application, Ser. No. 60/286,774, entitled "SPACE-TIME TRANSMIT DIVERSITY SCHEE FOR TIME-DISPERSIVE PROPAGATION MEDIA," filed Apr. 26, 2001, which is commonly owned and incorporated herein by reference in its entirety.

FIELD OF THE INVENTION

The present invention relates generally to wireless communication systems and in particular to space-time transmit diversity, in conjunction with time-domain equalization, for propagation channels that are time-dispersive.

BACKGROUND OF THE INVENTION

In cellular and land-mobile wireless systems, multi-element antenna receive diversity is commonly used to improve uplink performance. Improvements in downlink performance are also desirable, especially for data traffic, since load is expected to be greater for data in the downlink, than in the uplink (e.g., web-browsing scenario). One solution, receive diversity at the mobile handset, is not generally feasible due to limitations of space and cost.

Multi-element antenna transmit diversity implemented at the base station is, however, desirable in this case. Delay transmit diversity is one option, but its performance is significantly sub-optimal, and it may actually degrade performance in time-dispersive propagation media. An alternative space-time transmit diversity technique, developed by Siavash Alamouti in "A simple transmit diversity technique for wireless communications," IEEE Journal on Selected Areas in Communications, October 1998, offers full two-branch diversity gain in slowly-varying frequency-flat fading channels, and achieves the Shannon capacity of a multi-element antenna channel that has a two-element transmitter and a single-element receiver, as shown by Joseph Thomas in "On the capacity achieved by space-time block codes," Research Report, Institute for Systems Research, MD, May 1999. Alamouti's proposal consists of encoding the transmitted sequence in doublets such that the transmissions from the two antennas are mutually orthogonal and a linear demodulation scheme where the decision rule for maximum likelihood detection reduces to a comparison of distance metrics.

The scheme is described in FIG. 1. The elements of the transmitting antenna are indexed '0' and '1'. If $s_0$ and $s_0$ are transmitted in succession from antenna '0' at signaling intervals n and n+1 respectively then $-s_1^*$ and $s_0^*$ are transmitted during these signaling intervals from antenna '1'. This is a slight modification (made for convenience) of, though essentially equivalent to, the originally proposed version. If $h^{(0)}$ and $h^{(1)}$ are, respectively, the flat fading channel responses of the path from antennas '0' and '1' to the receiver (assumed to consist of a single-element antenna) then received mixtures at time n and n+1 are $$x_0 = h^{(0)}s_0 - h^{(1)}s_1^* + v_0$$

$$x_1 = h^{(0)}s_1 + h^{(1)}s_0^* + v_1$$

where $v_0$ and $v_1$ are noise samples, and * denotes complex conjugate. The total transmitted power is fixed at the same level as for the case of a transmitter with a single-element antenna, i.e., each of the two transmit antenna elements is allocated half the total transmitter power and the corresponding amplitude factors, are absorbed into the channel responses $h^{(0)}$ and $h^{(1)}$ above. The mixtures $x_0$ and $x_1$ are readily decoupled as below:

$$r_0 = h^{(0)*}x_0 + h^{(1)}x_1^* = (|h^{(0)}|^2 + |h^{(1)}|^2)s_0 + w_0$$

$$r_1 = h^{(0)*}x_1 - h^{(1)}x_0^* = (|h^{(0)}|^2 + |h^{(1)}|^2)s_1 + w_1$$

where $w_0 = h^{(0)*}v_0 + h^{(1)}v_1^*$ and $w_1 = h^{(0)*}v_1 - h^{(1)}v_0^*$. The maximum likelihood detector reduces to choosing $s_i$ if $$(|h^{(0)}|^2 + |h^{(1)}|^2 - 1)|s_i|^2 + \|r_j, s_i\|^2 \leq (|h^{(0)}|^2 + |h^{(1)}|^2 - 1)$$
$$|s_k|^2 + \|r_j, s_k\|^2, \forall (i \neq k)$$

The fact that transmissions on the two channels are mutually orthogonal is central to permitting a linear decoupling scheme at the demodulator. However, this does not work for practical (i.e., time-dispersive) channels since the orthogonality imposed by the Alamouti modulation technique is destroyed by such dispersivity.

Other known prior art includes patent application Ser. No. 09/624,453, entitled "Method and Device for Exploiting Transmit Diversity in Time Varying Wireless Communication Systems." This prior art extends Alamouti's method to work in time-dispersive channels, and contains some aspects in common with the present invention (chiefly, the use of time-reversed, conjugated symbol blocks on the second antenna) but is restrictive, on two counts. First, it requires data sub-blocks to be separated with either cyclic or zero prefixes, following the context of orthogonal frequency division multiplexing (OFDM) systems. Therefore it is not readily applicable to systems employing training-based channel estimation, such as the GSM cellular system. Second, it stipulates that equalization be accomplished in the frequency domain via linear processing. It is desirable to allow more robust time-domain equalization methods such as decision feedback equalization (DFE) and maximum likelihood sequence estimation (MLSE) to be used in addition to linear equalization. In sum therefore, the Alamouti scheme does not work for wideband systems where the propagation media are time-dispersive.

DETAILED DESCRIPTION

This invention extends Alamouti's scheme for wideband TDMA systems; it then works in conjunction with time-domain equalization. In fact, the present invention envisages time-domain DFE or MLSE equalization (which is more robust than linear frequency-domain equalization) via the use of a training mid-amble to separate adjacent sub-blocks; this mid-amble is used in equalizer training and its direct and intersymbol interference contributions to the received signal, are subtractively eliminated to facilitate the detection process itself. This approach may be applied to all systems in time-dispersive propagation media, where the burst or slot length is short enough that the fading can be considered time-invariant over its duration.

An easy generalization of the Alamouti scheme, say by examining higher-order block orthogonal schemes, is not possible since retaining the simplicity of the decoupling scheme in time-dispersive channels requires that the transmissions from different antennas be mutually shift orthogonal. An alternative approach is taken here where each of the symbols in the original scheme is replaced by a block of symbols, and using time-reversed complex conjugated blocks in place of the complex conjugated versions of the symbols in the original scheme. The two symbol-blocks transmitted in succession from an antenna constitute a user's transmission for the given time slot (in the context of a TDMA scheme) and are isolated from each other so that transmissions from the two antennas are mutually orthogonal. The channel impulse response is assumed to be invariant over the duration of each user's transmission over a given slot, and isolation between the two constituent symbol blocks is achieved by inserting a known training sequence mid-amble between them, as elaborated later. A simple decoupling scheme that achieves the desired diversity then becomes feasible, and it only remains to equalize the resulting sub-blocks.

Figure 1:
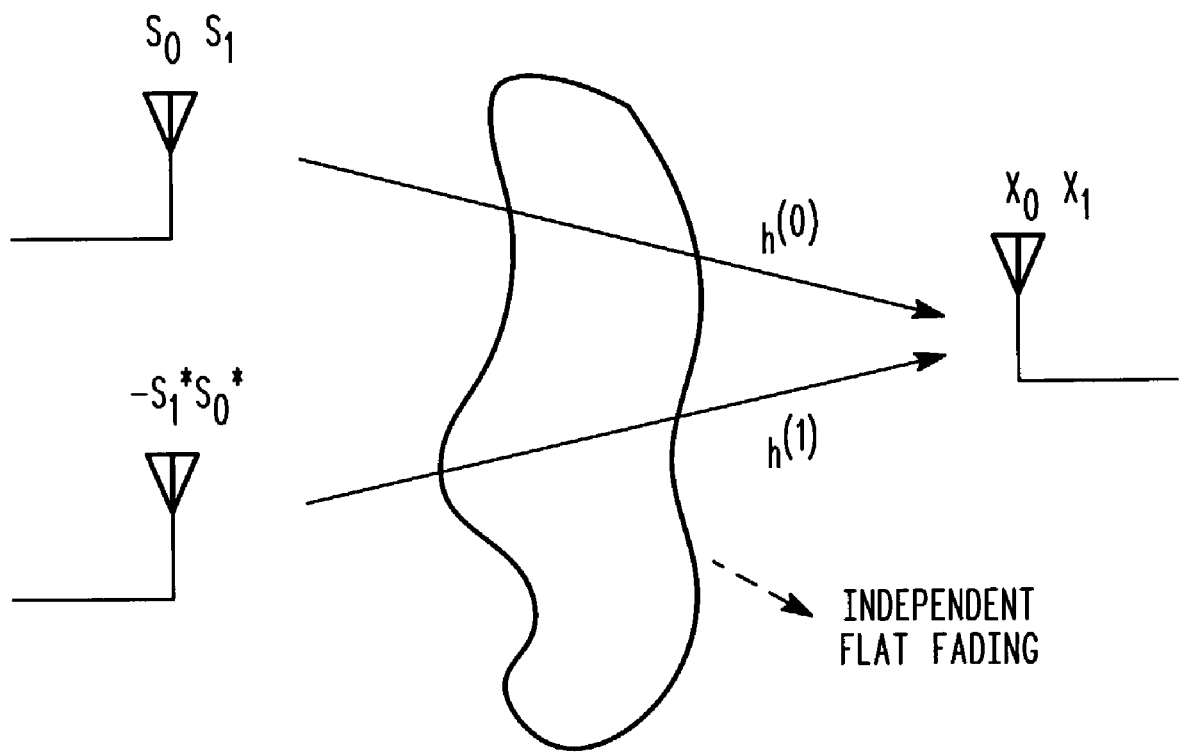
FIG. 1 is a depiction of Alamouti's prior art transmit diversity scheme.
Figure 2:
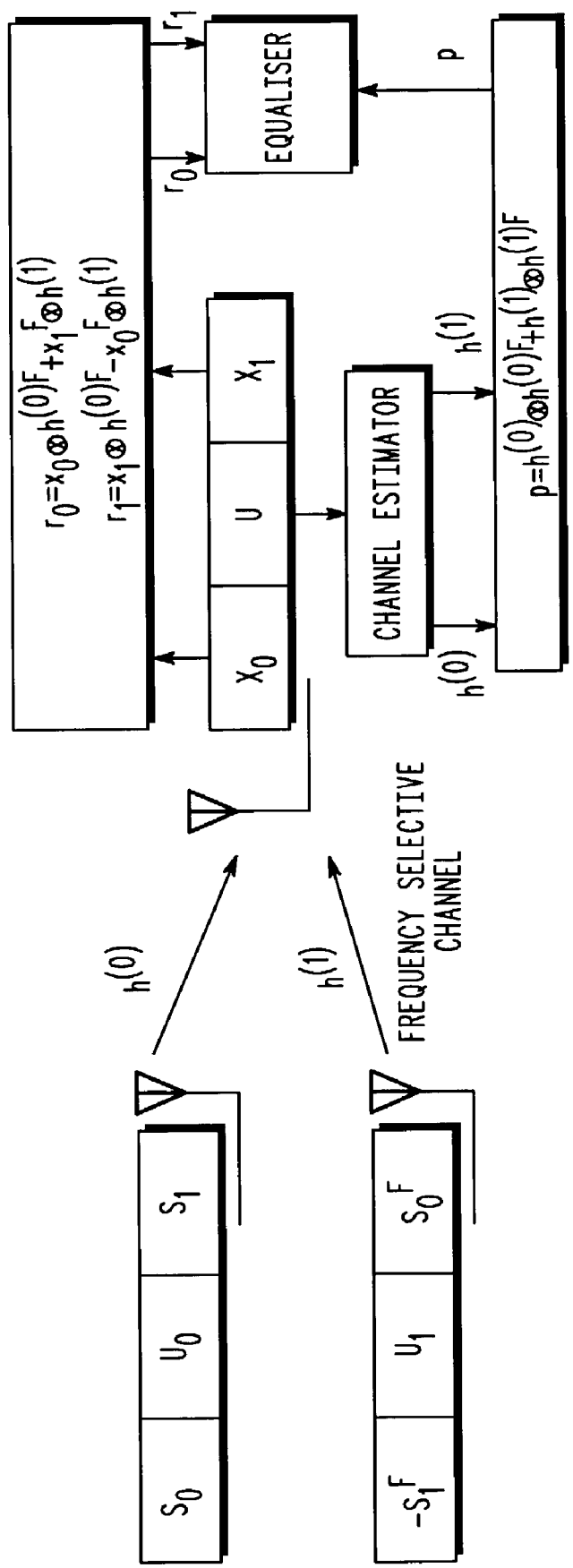
FIG. 2 is a block diagram depiction of an embodiment of the present invention.

With reference to FIG. 2, which is a schematic description of one embodiment of this invention, in the context of the GSM cellular system, each data burst contains a known training mid-amble. The sub-block of symbols transmitted by antenna element '0' preceding the mid-amble $u_0$ is denoted by $s_0$ and that following the mid-amble by $s_1$. Antenna element '1' effectively retransmits the information contained in this burst: it is comprised of $-s_1^F$ preceding the mid-amble $u_1$ and $s_0^F$ following the mid-amble, which are time-reversed and complex-conjugated versions of the symbol sub-blocks transmitted by antenna element '0'. (The superscript F denotes time-reversal and complex conjugation.) The received burst x is likewise viewed as comprising two sub-blocks, one preceding the segment corresponding to the transmitted mid-amble and one following it, denoted by $x_0$ and $x_1$ respectively. The received segment corresponding to the mid-amble is denoted by $x_u$. The equal division of the total transmitter power between the two transmit-elements applies here, as in the original Alamouti scheme. If the impulse responses of the channels (including transmitter and receiver filtering) from antenna elements '0' and '1' to the receiver, denoted respectively by $h^{(0)}$ and $h^{(1)}$, are assumed to be constant over the duration of the burst mid-amble, and the mid-amble is of adequate length to isolate the constituent sub-blocks from each other, then the received blocks $x_0$ and $x_1$ may be expressed as $$x_0 = h^{(0)} \otimes s_0 - h^{(1)} \otimes s_1^F + v_0$$

$$x_1 = h^{(0)} \otimes s_1 + h^{(1)} \otimes s_0^F + v_1$$

where the circle-cross character denotes convolution, and $v_0$ and $v_1$ represent noise. Effective mutual isolation of the sub-blocks $x_0$ and $x_1$ is possible in practice, because inter-symbol interference from the mid-ambles (due to time-dispersivity) in the signaling intervals immediately adjacent to the mid-amble interval may be eliminated once the channel responses have been estimated. This is accomplished by subtracting an estimate of the received mid-amble component, $$x_{u\,est} = h^{(0)} \otimes u_0 + h^{(1)} \otimes u_1$$

from the received burst x prior to the following step.

Assuming for the sake of explanation, perfect estimates for the impulse responses $h^{(0)}$ and $h^{(1)}$, the received mixtures may now be demodulated and decoupled by performing the following matched filtering/combining operations:

$$r_0 = h^{(0)F} \otimes x_0 + h^{(1)} \otimes x_1^F$$

$$r_1 = h^{(0)F} \otimes x_1 - h^{(1)} \otimes x_0^F$$

so that $$r_0 = (h^{(0)} \otimes h^{(0)F} + h^{(1)} \otimes h^{(1)F}) \otimes s_0 + w_0 = p \otimes s_0 + w_0$$

$$r_1 = (h^{(0)} \otimes h^{(0)F} + h^{(1)} \otimes h^{(1)F}) \otimes s_1 + w_1 = p \otimes s_1 + w_1$$

Here p is the effective, diversity-combined channel impulse response, through which the desired diversity gain is produced. Also, $w_0$ and $w_1$ are noise components resulting from applying the filtering/combining operations to $v_0$ and $v_1$. Note that $r_0$ depends solely on $s_0$, and, similarly, $r_1$ depends solely on $s_1$, so that the cross-mixing of the two data blocks is effectively cancelled.

It then remains to recover the symbol blocks $s_0$ and $s_1$ by equalizing the processed vectors $r_0$ and $r_1$. This can be carried out via linear, decision feedback, or MLSE techniques as appropriate, based on the diversity-combined channel impulse response p. Thus transmit diversity benefits are available at the mobile subscriber unit if the channel responses $h^{(0)}$ and $h^{(1)}$ are uncorrelated. It must be stressed that the received mixtures need to be demodulated as entire blocks; this does not pose any additional latency constraint since the demodulation process can commence only after the channel impulse responses have been estimated, which in turn requires that the segment corresponding to the training mid-ambles be already received. In practice, the impulse responses $h^{(0)}$ and $h^{(1)}$ can be estimated by a joint least squares technique. For best performance, the training sequences $u_0$ and $u_1$ transmitted from the two antennas should be roughly mutually shift-orthogonal. Joint channel estimation methods and training sequence design are well-known in the art; see, for example, "Optimum and Suboptimum Channel Estimation for the Uplink of CDMA Mobile Radio Systems with Joint Detection," by Bernd Steiner and Peter Jung, in European Transactions on Telecommunications and Related Technologies, pp. 39-50, 1994.

While the present invention has been particularly shown and described with reference to particular embodiments thereof, it will be understood by those skilled in the art that various changes in form and details may be made therein without departing from the spirit and scope of the present invention.

What is claimed is:

1. A method for recovering a symbol block comprising:
   receiving the symbol block (x) via a first wireless channel and a second wireless channel, wherein the symbol block comprises a first sub-block ($x_0$), a predefined mid-amble, and a second sub-block ($x_1$);
   estimating a first impulse response ($h^{(0)}$) of the first wireless channel and a second impulse response ($h^{(1)}$), of the second wireless channel using the received predefined mid-amble;
   demodulating the received symbol block using $h^{(0)}$ and $h^{(1)}$ to produce processed vectors $r_0$ and $r_1$, wherein $$r_0 = h^{(0)F} \otimes x_0 + h^{(1)} \otimes x_1^F \text{ and}$$

$$r_1 = h^{(0)F} \otimes x_1 - h^{(1)} \otimes x_0^F$$

where "$\otimes$" denotes convolution and "F" denotes time-reversal and complex conjugation;
   equalizing the processed vectors $r_0$ and $r_1$ to recover transmitted symbol blocks $s_0$ and $s_1$ wherein $s_0$ corresponds to $x_0$ and $s_1$ corresponds to $x_1$ and wherein $$x_0 = h^{(0)} \otimes s_0 - h^{(1)} \otimes s_1^F + v_0 \text{ and}$$

$$x_1 = h^{(0)} \otimes s_1 + h^{(1)} \otimes s_0^F + v_1$$

so that $$r_0 = (h^{(0)} \otimes h^{(0)F} + h^{(1)} \otimes h^{(1)F}) \otimes s_0 + w_0 \text{ and}$$

$$r_1 = (h^{(0)} \otimes h^{(0)F} + h^{(1)} \otimes h^{(1)F}) \otimes s_1 + w_1$$

where $w_0$, $w_1$, $v_0$, and $v_1$ are noise components.

2. The method of claim 1 further comprising subtracting an estimate of the received mid-amble component, $$x_{uest} = h^{(0)} \otimes u_0 + h^{(1)} \otimes u_1$$

from received burst (x), wherein $u_0$ is a predefined mid-amble of the first wireless channel and $u_1$ is a predefined mid-amble of the second wireless channel.

3. The method of claim 1 wherein a joint least squares technique is used to estimate $h^{(0)}$ and $h^{(1)}$.

4. The method of claim 1 wherein linear equalization is used to equalize the processed vectors $r_0$ and $r_1$ to recover transmitted symbol blocks $s_0$ and $s_1$.

5. The method of claim 1 wherein decision feedback is used to equalize the processed vectors $r_0$ and $r_1$ to recover transmitted symbol blocks $s_0$ and $s_1$.

6. The method of claim 1 wherein maximum likelihood sequence estimation (MLSE) is used to equalize the processed vectors $r_0$ and $r_1$ to recover transmitted symbol blocks $s_0$ and $s_1$.

7. A receiver comprising:
a means for receiving a symbol block via a first wireless channel and a second wireless channel, wherein the symbol block comprises a first sub-block ($x_0$), a predefined mid-amble, and a second sub-block ($x_1$);
a means for estimating a first impulse response ($h^{(0)}$) of the first wireless channel and a second impulse response ($h^{(1)}$), of the second wireless channel using the received predefined mid-amble;
a means for demodulating the received symbol block using $h^{(0)}$ and $h^{(1)}$ to produce processed vectors $r_0$ and $r_1$, wherein $$r_0 = h^{(0)F} \otimes x_0 + h^{(1)} \otimes x_1^F \text{ and}$$

$$r_1 = h^{(0)F} \otimes x_1 + h^{(1)} \otimes x_0^F$$

where "$\otimes$" denotes convolution and "F" denotes time-reversal and complex conjugation;
a means for equalizing the processed vectors $r_0$ and $r_1$ to recover transmitted symbol blocks $s_0$ and $s_1$, wherein $s_0$ corresponds to $x_0$ and $s_1$ corresponds to $x_1$ and wherein $$x_0 = h^{(0)} \otimes s_0 - h^{(1)} \otimes s_1^F + v_0 \text{ and}$$

$$x_1 = h^{(0)} \otimes s_1 - h^{(1)} \otimes s_0^F + v_1$$

so that $$r_0 = (h^{(0)} \otimes h^{(0)F} + h^{(1)} \otimes h^{(1)F}) \otimes s_0 + w_0 \text{ and}$$

$$r_1 = (h^{(0)} \otimes h^{(0)F} + h^{(1)} \otimes h^{(1)F}) \otimes s_1 + w_1$$

where $w_0$, $w_1$, $v_0$, and $v_1$ are noise components.

\* \* \* \* \*

UNITED STATES PATENT AND TRADEMARK OFFICE
CERTIFICATE OF CORRECTION

PATENT NO. : 7,471,734 B2  Page 1 of 1
APPLICATION NO. : 10/131429
DATED : December 30, 2008
INVENTOR(S) : Joseph Thomas et al.

It is certified that error appears in the above-identified patent and that said Letters Patent is hereby corrected as shown below:

In Column 1, Line 52, delete "$s_0$ and $s_0$" and insert -- $s_0$ and $s_1$ --, therefor.

In Column 2, Line 60, delete "intersymbol" and insert -- inter-symbol --, therefor.

In Column 3, Lines 31-61, delete "The received burst......following step." and insert the same in the line 32, as a new paragraph.

In Column 4, Line 63, in Claim 1, delete "$s_1$" and insert -- $s_1$, --, therefor.

In Column 6, Line 13, in Claim 7, delete " $r_1 = h^{(0)F}(x) x_1 + h^{(1)}(x) x_0^F$ " and insert -- $r_1 = h^{(0)F}(x) x_1 - h^{(1)}(x) x_0^F$ --, therefor.

In Column 6, Line 21, in Claim 7, delete " $x_1 = h^{(0)}(x) s_1 - h^{(1)}(x) s_0^F + v_1$ " and insert -- $x_1 = h^{(0)}(x) s_1 + h^{(1)}(x) s_0^F + v_1$ --, therefor.

Signed and Sealed this

Eleventh Day of August, 2009

David J. Kappos
*Director of the United States Patent and Trademark Office*